United States Patent
Noel et al.

(10) Patent No.: US 9,378,057 B2
(45) Date of Patent: Jun. 28, 2016

(54) PARAVIRTUALIZED MIGRATION COUNTER

(71) Applicant: Red Hat Israel, Ltd., Raanana (IL)

(72) Inventors: Karen Noel, Pembroke, NH (US); Paolo Bonzini, Turate (IT); Ronen Hod, Shoham (IL); Marcelo Tosatti, Porto Alegre (BR)

(73) Assignee: Red Hat Israel, Ltd., Raanana (IL)

( * ) Notice: Subject to any disclaimer, the term of this patent is extended or adjusted under 35 U.S.C. 154(b) by 37 days.

(21) Appl. No.: 14/193,344

(22) Filed: Feb. 28, 2014

(65) Prior Publication Data

US 2015/0248303 A1 Sep. 3, 2015

(51) Int. Cl.
*G06F 9/48* (2006.01)
*G06F 9/50* (2006.01)
*G06F 11/34* (2006.01)
*G06F 9/455* (2006.01)

(52) U.S. Cl.
CPC ............ *G06F 9/4856* (2013.01); *G06F 9/4555* (2013.01); *G06F 9/5088* (2013.01); *G06F 11/3466* (2013.01); *G06F 11/3495* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,291,416 B2 | 10/2012 | Cartales | |
| 2010/0299665 A1 | 11/2010 | Adams | |
| 2011/0296411 A1 | 12/2011 | Tang et al. | |
| 2012/0296585 A1 | 11/2012 | Chen et al. | |
| 2013/0060837 A1 | 3/2013 | Chakraborty et al. | |
| 2013/0097296 A1* | 4/2013 | Gehrmann | G06F 9/4856 709/223 |
| 2013/0219389 A1 | 8/2013 | Serebrin et al. | |
| 2014/0096137 A1* | 4/2014 | Bhandaru | G06F 11/3409 718/102 |
| 2015/0052526 A1* | 2/2015 | Fujiwaka | G06F 11/3409 718/1 |

OTHER PUBLICATIONS

USPTO, Notice of Allowance for U.S. Appl. No. 14/293,185 mailed Feb. 26, 2016.
Benevenuto, Fabricio et al., "A Quantitavive Analysis of the Xen Virtualization Overhead", Computer Science Department, Federal Univeristy of Minas Gerais, Brazil, 9 Pages http://homepages.dcc.ufmg.br/~fabricio/download/ccc07.pdf (Last accessed Feb. 5, 2016).
Du, Jiaqing et al., "Performance Profiling in a Virtualized Environment", EPFL, Switzerland; IIT Guwahati, India, 6 Pages https://www.usenix.org/legacy/event/hotcloud10/tech/full_papers/Du.pdf (Last accessed Feb. 5, 2016).

(Continued)

*Primary Examiner* — Qing Wu
(74) *Attorney, Agent, or Firm* — Lowenstein Sandler LLP

(57) ABSTRACT

An application associated with a processor reads a first value of a counter and a second value of the counter. The counter is indicative of a migration status of the application with respect to the processor. Responsive to determining that the first value of the counter does not equal the second value of the counter, the application ascertains whether a value of a hardware parameter associated with the processor has changed during a time interval. The migration status indicates a count of the number of times the application has migrated from one processor to another processor. The application determines the validity of a value of a performance monitoring unit derived from the hardware parameter in view of the application ascertaining whether the value of the hardware parameter has changed during the time interval.

20 Claims, 7 Drawing Sheets

(56) References Cited

OTHER PUBLICATIONS

Jin, Hai, et al., "Live Virtual Machine Migration with Adaptive Memory Compression", Services Computing Technology and System Lab; Cluster and Grid Computing Lab, School of Computer Science and Technology, Huazhong University of Science and Technology, Wuhan, China, Dec. 1, 2009, 10 Pages http://grid.hust.edu.cn/wusong/file/Cluster'09.PDF.

Nikolaev, Ruslan et al., "Perfctr-Xen: A Framework for Performance Counter Virtualization", Virginia Polytechnic Institute, Blacksburg, VEE'11, Mar. 9-11, 2011, Newport Beach, California, USA, 11 pages http://www.cse.iitb.ac.in/~puru/courses/spring12/cs695/downloads/perfctr.pdf.

Noel, Karen et al. "Paravirtualized Migration Counter For Migrating A Virtual CPU To A Different Physical CPU", U.S. Appl. No. 14/293,185, filed Jun. 2, 2014.

Pan, Zhenhao, et al., "CompSC: Live Migration with Pass-through Devices", VEE'12, Mar. 3-4, 2012, London, England, UK, 12 Pages http://www.cl.cam.ac.uk/research/srg/netos/vee_2012/papers/p109.pdf.

USPTO, Office Action for U.S. Appl. No. 14/293,185 mailed Sep. 22, 2015.

USPTO, Notice of Allowance for U.S. Appl. No. 14/293,185 mailed Nov. 19, 2015.

\* cited by examiner

1. Read PV-migration-count (M1)

2. Read processor frequency (F1)

- Measurement interval -

3. Read PV-migration-count (M2)

4. If M1 == M2, the measurement is good

5. If M1 != M2:

5a. Read processor frequency (F2)

5b. Read PV-migration-count (M3)

5c. If (M3 - M1) == 1 && F1 == F2, the measurement is valid

5d. Otherwise, the measurement is not valid.

FIGURE 4

1. Read PV-migration-count (M1)

2. Read important processor attributes (A1)

3. Measurement interval

4. Read PV-migration-count (M2)

5. If M1 == M2, go to step 9

6. Read important processor attributes (A2)

7. Read PV-migration-Count (M3)

8. If (M3 - M1) == 1 && A1 == A2, go to step 9

8a. Othersize, set M1 := M3, set A1 := A2, go to step 3

9. Tune the application

10. Read PV-migration-count (M4)

11. If M4 == M3, go to step 13

12. If M4 != M3:

12a. Read important processor attributes (A3)

12b. If (M4 - M3) == 1 && A3 == A1, set M3 := M4, go to step 13

12c. Otherwise, M1 := M4, A1 := A3, go to step 3

13. Wait for a period

14. Go to step 10

FIGURE 5

1. Read PV-migration-count (M1)
2. Read processor frequency (F1)
- measurement interval -
3. Read processor frequency (F2)
4. Read PV-migration-count (M2)

FIGURE 6

PARAVIRTUALIZED MIGRATION COUNTER

TECHNICAL FIELD

The present disclosure is generally related to virtualized computer systems, and is more specifically related to systems and methods for virtual machine live migration.

BACKGROUND

The use of virtualization is becoming widespread. Virtualization describes a software abstraction that separates a computer resource and its use from an underlying physical device. Generally, a virtual machine (VM) provides a software execution environment and may have a virtual processor, virtual system memory, virtual storage, and various virtual devices. Virtual machines have the ability to accomplish tasks independently of particular hardware implementations or configurations.

Virtualization permits multiplexing of an underlying host machine (associated with a physical CPU) between different virtual machines. The host machine or "host" allocates a certain amount of its resources to each of the virtual machines. Each virtual machine may then use the allocated resources to execute applications, including operating systems (referred to as guest operating systems (OS) of a "guest"). The software layer providing the virtualization is commonly referred to as a hypervisor and is also known as a virtual machine monitor (VMM). The hypervisor emulates the underlying hardware of the virtual machine, making the use of the virtual machine transparent to the guest operating system and the user of the VM.

BRIEF DESCRIPTION OF THE DRAWINGS

FIG. 4 is an example of a performance monitoring tool application employing the method of FIG. 3 to program and read hardware parameters stored in PMU registers while running in a virtual machine.

FIG. 5 is another example of a performance monitoring tool application employing the method of FIG. 3 to auto-tune the application.

FIG. 6 is an example of a performance monitoring tool application employing the method of FIG. 3 to program and read hardware parameters stored in PMU registers while running in a virtual machine.

DETAILED DESCRIPTION

Figure 1:
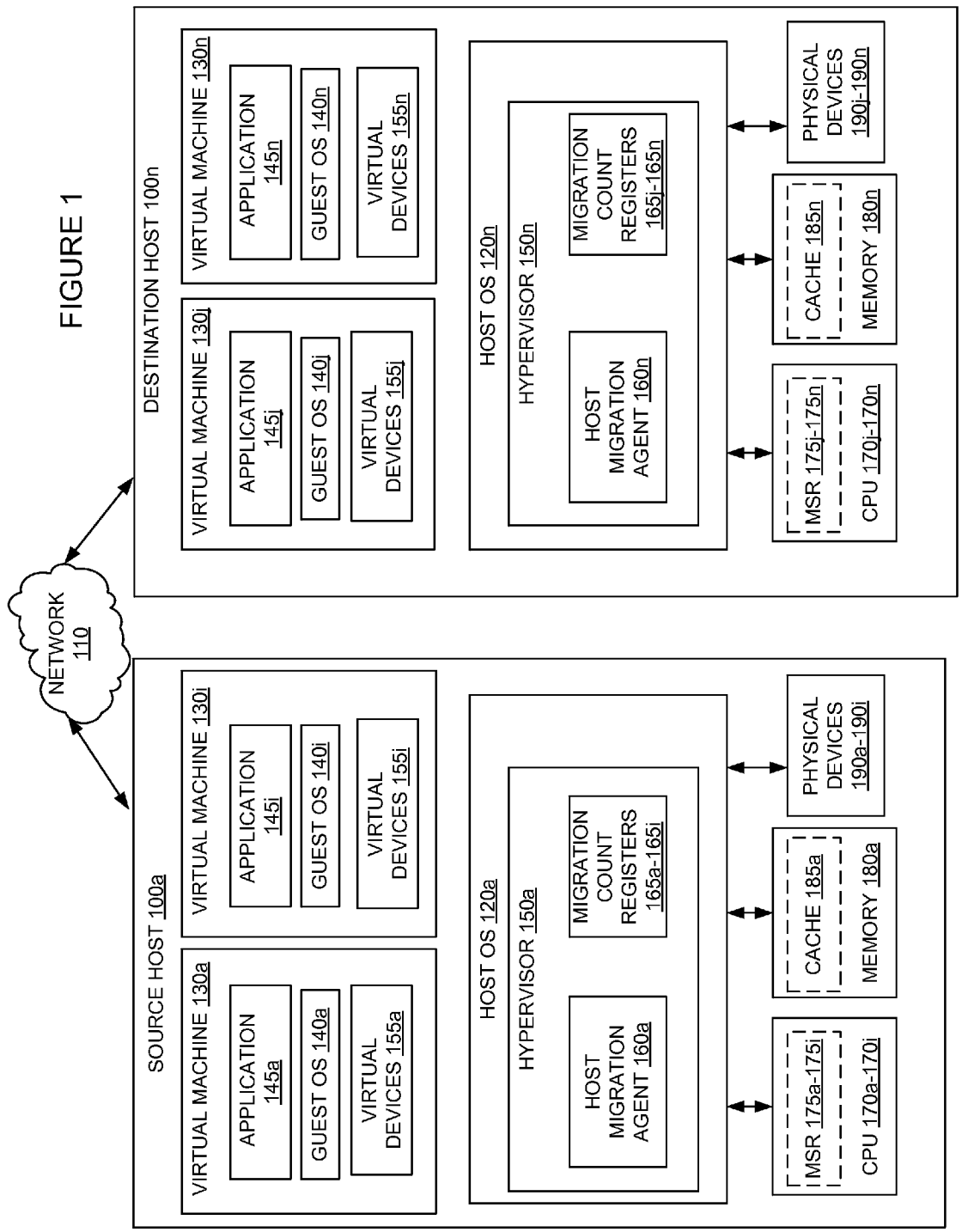
FIG. 1 is a block diagram that illustrates an example source host computer system and a destination host computer system in which examples of the present disclosure may operate.

Methods and systems for permitting an application running on a virtual machine to determine whether performance monitoring unit (PMU) values measured at different time intervals are valid or invalid are disclosed. For example, a performance monitoring tool application running on the virtual machine may need to determine if one or more PMU values remain valid before, during, and/or after a migration event. Examples of PMU values may include the time of execution of a specific instruction or group of instructions, the number of cache misses per unit time, etc. The PMU values may depend on one or more underlying hardware parameters including processor frequency, cache line size of a cache, etc., respectively.

When the performance monitoring tool application attempts to read a hardware parameter associated with one or more virtual devices, the read call may be trapped by an underlying hypervisor. The hypervisor may access corresponding model specific registers (MSRs) of the underlying central processing unit (CPU). The MSRs may provide the one or more hardware parameters associated with one or more of corresponding physical devices.

If, for example, a hardware parameter (e.g., processor frequency) has changed during a time interval, the performance monitoring tool application may not "know" whether the change was due to a migration event occurring during the time interval. Similarly, a hardware parameter may appear to not change as a result of two successive migration events during the time interval. In one example, the virtual machine may attempt to read two values of processor frequency spaced apart in time. If the time interval is sufficiently large, the virtual machine may have been migrated from a first CPU to a second CPU and back to the first CPU with the operating frequency of the second CPU differing from the processor frequency of the first CPU. Similarly, the virtual machine may have been migrated from a first CPU with a first operating frequency and/or processor type to a second CPU with a second operating frequency/second processor type and then to a third CPU with the same operating frequency/processor type as the first CPU. In both cases, PMU values derived from the hardware parameter measured during the same time interval would be invalid, although the performance monitoring tool application takes the measurements to be valid measurements.

To permit an application (e.g., a performance monitoring tool) to determine whether or not to discard PMU values during a live migration, the application is provided with a migration counter for each virtual machine under the control of a hypervisor. An application associated with a host processing device reads a first value of a counter and a second value of the counter. The counter is indicative of a migration status of the application with respect to the host processing device. Responsive to determining that the first value of the counter does not equal the second value of the counter, the application ascertains whether a value of a hardware parameter associated with the host processing device has changed during a time interval. The migration status indicates a count of the number of times the application has migrated from one host processing device to another host processing device. The number of times the application has migrated may be employed by the application to determine whether the value of a performance monitoring unit derived from the hardware parameter is valid or not.

A hypervisor controlling the virtual machine may be configured to maintain, manipulate (e.g., increment, reset), and provide the application with access to the migration counter associated with the virtual machine. The migration counter may be stored by the hypervisor in a synthesized paravirtualized migration count register. The migration count register may be a model-specific register (MSR).

In one example, the migration count values for each of the virtual machines may be stored in a plurality of paravirtualized migration count registers by the hypervisor running on the host.

In one example, the migration counter may be stored by the hypervisor in the memory space of the application. In another example, reading may comprise performing a system call to the hypervisor. In an example, the hardware parameter may be at least one of an operating frequency of a CPU of the host, a cache-line size of the CPU, etc. In an example, the PMU counters derived from the hardware parameter may be at least one of a time stamp count of a CPU of the host, a count of cache misses, respectively, etc.

If the application determines that the value of the migration counter has not changed during the time interval, indicating that no migration event has occurred, then the application may declare the value of the performance monitoring unit derived from the hardware parameter to be valid.

If the application ascertains that the second value of the migration counter differs from the first value of the migration counter by more than one count, indicating two or more migration events, then the application may declare the value of the performance monitoring unit to be invalid.

If, however, the value of the migration counter changes by one count between a reading of the first value of the migration counter and the second value of the migration counter during the time interval, it is not certain whether the value of the performance monitoring unit is valid or not valid. In such circumstances, in one example, the application may be configured to read a third value of the migration counter.

If the application ascertains that the third value of the migration counter differs from the first value of the migration counter by one count and the value of hardware parameter has not changed, then the application may declare the value of the performance monitoring unit to be valid. If the application ascertains that the third value of the migration counter differs from the first value of the counter by one count and the value of hardware parameter has changed, then the application may declare the value of the performance monitoring unit to be invalid.

Accordingly, an efficient method and system is provided that enables an application to determine whether values of a performance monitoring unit(s) and underlying hardware parameter values measured at different time intervals are valid or invalid. The paravirtualized migration counter described herein permits performance tools running in a virtual machine to determine whether the virtual machine has migrated during its latest measurement interval. Based on that knowledge, the application can indicate performance results that are not valid. Additionally, performance tools can display the results of measurement intervals during live migration if no important attributes of a physical processor of a source host have changed on a physical processor of a destination host.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example source host computer system 100a (the "source host 100a") and a destination host computer systems 100n (the "destination host 100n") in which examples of the present disclosure may operate. In one example, the source host 100a may access the destination host 100n over a network 110, which may be, for example, a local area network (LAN), a wide area network (WAN), intranet, the Internet, etc. The source host 100a and the destination hosts 100n may each include hardware components such as one or more central processing units (CPUs) 170a-170n, memory 180a-180n, and other hardware components 190a-190n (a network interface card (NIC), a disk, a virtual central processing unit, etc.), respectively. The source host 100a and/or the destination host 100n may be a server, a workstation, a personal computer (PC), a mobile phone, a palm-sized computing device, a personal digital assistant (PDA), etc.

Throughout the following description, the term "virtualization" herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on underlying hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

"Physical processor" or "processor" or "central processing unit" (CPU) or "host processing device" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a CPU. "Memory device" herein shall refer to a volatile or non-volatile memory device, such as RAM, ROM, EEPROM, or any other device capable of storing data. "I/O device" herein shall refer to a device capable of providing an interface between one or more processor pins and an external device capable of inputting and/or outputting binary data.

As noted herein above, the source host 100a and the destination host 100b may run multiple virtual machines 130a-130n, by executing a software layer (e.g., 150a, 150n), often referred to as the "hypervisor," above the hardware and below the virtual machines, as schematically shown in FIG. 1. In one illustrative example, the hypervisor (e.g., 150a, 150n) may be a component of a host operating system (e.g., 120a-120n) executed by the source host 100a and the destination host 100b. Alternatively, the hypervisor (e.g., 150a, 150n) may be provided by an application running under the host operating system (e.g., 120a-120n), or may run directly on the source host 100a and the destination host 100b without an operating system beneath it. The hypervisor (e.g., 150a, 150n) may abstract the physical layer, including processors, memory, and I/O devices, and present this abstraction to virtual machines (e.g., 130a-130n) as virtual devices (e.g., 155a-155n), including virtual processors, virtual memory, and virtual I/O devices.

A virtual machine (e.g., 130a-130n) may execute a guest operating system (e.g., 140a-140n) which may utilize the underlying virtual devices (e.g., 155a-155n), each of which may map to a device of the host machine (e.g., a network interface device, a CD-ROM drive, etc.). One or more applications (e.g., 145a-145n) may be running on a virtual machine (e.g., 130a-130n) under the guest operating system (e.g., 140a-140n). In an example, an application (e.g., 145a-145n) may include the corresponding complete virtual machine (e.g., 130a-130n) running on a respective hypervisor (e.g., 150a, 150n).

A virtual machine (e.g., 130a-130n) may include multiple virtual processors (not shown). Processor virtualization may be implemented by the hypervisor (e.g., 150a, 150n) scheduling time slots on one or more CPUs (e.g., 170a-170n) such that from the guest operating system's perspective those time slots are scheduled on a virtual processor. Memory virtualization may be implemented by a page table (PT) which is a memory structure translating virtual memory addresses to physical memory addresses.

The term "paravirtualization" refers to a virtualization technique that presents to virtual machines an interface that is similar but not identical to that of the underlying hardware, with the purpose of improving the overall system performance, e.g., by adding a register (MSR) that software in the virtual machine may read to obtain information that does not exist on physical CPUs.

The source host 100a and the destination host 100n may each instantiate, run, migrate, and/or terminate one or more virtual machines 130a-130n. A virtual machine (e.g., 130a) may run a guest operating system (e.g., 140a) to manage its resources. The virtual machine (e.g., 130a) may run the same or different guest operating system (e.g., guest OS 140a), such as Microsoft Windows®, Linux®, Solaris®, Mac® OS, etc.

In one example, the source host 100a and the destination host 100n may each instantiate and run a hypervisor (e.g., 150a, 150n) to virtualize access to the underlying source host hardware (e.g., CPUs 170a-170n, memory 180a-180n, other physical devices 190a-190i, etc.), making the use of the one or more virtual machines 130a-130n transparent to the guest OSs 140a-140n and users (e.g., a system administrator) of the source host 100a and the destination host 100n. A virtual machine (e.g., 130a) may not have direct access to the underlying source host hardware 170a-170n, 180a-180n, 190a-190n, etc.

Access to or emulation of the underlying hardware of the source host 100a and the destination host 100n (e.g., CPUs 170a-170n, memory 180a-180n, other physical devices 190a-190n, etc.), may be indirectly handled by a corresponding hypervisor (e.g., 150a, 150n). A guest OS (e.g., 140a-140n) may be configured to load device-specific modules (guest device drivers, not shown) associated with one or more virtual devices 155a-155n. A hypervisor (e.g., 150a, 150n) may be configured to emulate (e.g., provide the guest OS (e.g., 140a-140n) with access to) the one or more virtual devices 155a-155n in cooperation with the guest device drivers (not shown) residing on a virtual machine (e.g., 130a-130n).

Initially a virtual machine (e.g., 130a) running a guest OS (e.g., 140a) is managed by a source hypervisor (e.g., 150a). In one example, a process is provided wherein the virtual machine (e.g., 130a) is migrated from the source hypervisor (e.g., 150a) residing on a first host operating system (OS) (e.g., 120a) to one or more destination hypervisors (e.g., 150a, 150n).

A performance engineer may analyze performance statistics of a computer-based processing system (e.g., the source host 100a and/or the destination host 100b). The processing system (e.g., the source host 100a and/or the destination host 100b) may provide performance tools to the performance engineer. The performance tools may rely on one or more values of performance monitoring unit (PMU) counters, to provide the performance engineer with a report on performance statistics of the underlying host CPU (e.g., 170a-170n). PMU counts may be provided by one or more PMU registers or model specific registers (MSRs) of the host CPU (e.g., 170a-170n). Example PMU counters may include, but are not limited to, a timestamp counts, the number of cache misses, etc.

PMU counters may be provided with virtual machines (e.g., 130a-130n). Typically, a PMU counter of a host CPU (e.g., 170a-170n) may be used directly by the virtual machine (e.g., 130a-130n). The hypervisor (e.g., 150a, 150n) ensures that PMU register values are provided to the right context, either the host or any number of guests.

Virtual machines (e.g., 130a-130n) may be migrated between a source host computing platform (e.g., the source host 100a) and a destination host computing platform (e.g., the destination host 100b) connected over a network 110, which may be a local-area network or a wide area-network that may include the Internet. Migration permits a clean separation between hardware and software, thereby improving facilities fault management, load balancing, and low-level system maintenance.

Unfortunately, because virtual machines (e.g., 130a-130n) can be migrated, while running, from the source host 100a to the destination host 100b with different CPUs (e.g., 170a-170i, 170j-170n, respectively), performance tools typically cannot be used during the live migration process. The source host 100a and the destination host 100b may contain CPUs with different frequencies and cache sizes. After the virtual machine (e.g., 130a-130n) is migrated, performance calculations relying on the underlying PMU counters of the destination host CPUs (e.g., 170j-170n) may be incorrect and misleading.

For example, a performance engineer running a typical performance tool unmodified on a virtual machine (e.g., 130a) that has been migrated may not know whether the destination host CPU (e.g., 170n) is of the same type as the source host CPU (e.g., 170a). Even if the destination host CPU (e.g., 170n) is of the same type as the source host CPU (e.g., 170a), the destination host CPU (e.g., 170n) may run at a different frequency. Even if the performance tool provides a notification to the performance engineer that the virtual machine (e.g., 130a) has migrated, the performance monitoring tool cannot determine which measurement intervals are valid or invalid. The performance monitoring tool cannot report valid processor attributes after the migration notification in situations where two migrations have happened. The virtual machine may have migrated back to the source host 100a, which would mislead the tool to conclude that the measurements were valid when they were not valid.

To provide indications of valid and/or invalid measurements of PMU values performed during a live migration, in one example, the source hypervisor (e.g., 150a) and the destination hypervisor (e.g., 150*n*) may be provided with corresponding host migration agents (160*a*,160*n*). It should be noted that the "source" and "destination" designations for the hypervisors (e.g., 150*a*, 150*n*) and host migration agents (160*a*,160*n*) are provided for reference purposes in illustrating an exemplary implementation of the migration process according to examples of the present disclosure. It will be further appreciated that depending on the particulars of a given migration event, a hypervisor may at one time serve as the source hypervisor, while at another time the hypervisor may serve as the destination hypervisor.

The host migration agents (e.g., 160*a*,160*n*) are components (e.g., a set of instructions executable by a processing device of the source host 100*a* and the destination host 100*n*, such as CPUs 170*a*-170*n*). Although shown as discrete components of the hypervisors (e.g., 150*a*,150*n*), the host migration agents (e.g., 160*a*,160*n*) may be a separate component externally coupled to hypervisors (e.g., 150*a*,150*n*).

In one example, the virtual machine 130*a* may be migrated to a destination host (e.g., 100*n*). In another example, the virtual machine 130*a* may be migrated concurrently to a plurality of destination hosts (not shown).

In one example, the source host 100*a* may migrate a virtual machine (e.g., 130*a*) residing on a source CPU (e.g., 170*a*) to a CPU (e.g., 170*n*) of the destination host 100*n*. In another example, the source host 100*a* may migrate the virtual machine (e.g., 130*a*) residing on a source CPU (e.g., 170*a*) to another CPU (e.g., 170*i*) of the source host 100*a*. A performance monitoring tool application (e.g., 145*a*) running on a guest OS (e.g., 140*a*) running on the virtual machine (e.g., 130*a*) may need to determine if one or more values of a performance monitoring unit (PMU) remain valid before, during, and/or after a migration event. The values of a PMU may rely upon an underlying hardware parameter. If the underling hard parameter changed during a measurement time interval, then the PMU value derived from the hardware parameter is invalid. Examples of the hardware parameter may be at least one of an operating frequency of the processing device, a cache-line size, etc. In an example, the PMU counters derived from the hardware parameter may be at least one of a time stamp count, a count of cache misses, respectively, etc.

When an application (e.g., 145*a*) attempts to read a hardware parameter associated with one or more of the virtual devices 155*a*-155*n*, the read call is trapped by the underlying hypervisor (e.g., 150*a*). The hypervisor (e.g., 150*a*) may access corresponding model specific registers (MSRs) 175*a*-175*i* of the underlying CPU (e.g., 170*a*). The MSRs 175*a*-175*i* may provide the one or more hardware parameters associated with one or more of the corresponding physical devices 190*a*-190*i*.

If, for example, a hardware parameter (e.g., processor frequency) has changed during a time interval, the performance monitoring tool application (e.g., 145*a*) may not "know" whether the change was due to a migration event during the time interval. Similarly, a hardware parameter may appear to not change as a result of two successive migration events during the time interval. In one example, the virtual machine may attempt to read two values of processor frequency spaced apart in time. If the time interval is sufficiently large, the virtual machine (e.g., 130*a*) may have been migrated from CPU 170*a* to CPU 170*n* and back to CPU 170*a* with the processor frequency of CPU 170*n* differing from the processor frequency of CPU 170*a*. Similarly, the virtual machine (e.g., 130*a*) may have been migrated from CPU 170*a* with a first clock frequency and/or processor type to CPU 170*i* with a second clock frequency/second processor type and then to a third CPU 170*n* with the same clock frequency/processor type as CPU 170*a*. In both cases, the two obtained PMU values would be invalid, although the performance monitoring tool application (e.g., 145*a*) takes the two measurements to be valid measurements.

To discard invalid measurements of hardware parameters and PMU values derived from the underling hardware parameters during migration events, the hypervisors 150*a*, 150*n* may be provided with corresponding host migration agents 160*a*, 160*n*, respectively. The host migration agents 160*a*, 160*n* may be configured to maintain, manipulate (e.g., increment, reset), and provide access to migration counters associated with corresponding ones of the virtual machines 130*a*-130*n*. Each migration counter may be indicative of the migration status of a corresponding application (e.g., 145*a*-145*n*). The application may be a separate executable program running on a virtual machine (e.g., 130*a*-130*n*, respectively), or may be the virtual machine itself (e.g., 130*a*-130*n*, respectively). Each migration counter may indicate a count of the number of times the application/virtual machine has migrated from one host processing device (e.g., CPU 170*a*) to another host processing device (e.g., CPU 170*i*, CPU 170*n*, etc.). The paravirtualized migration counters may be stored by each of the hypervisors (150*a*, 150*n*) in a plurality of synthesized paravirtualized migration count registers 165*a*-165*n*. Each of the migration count registers 165*a*-165*n* may correspond to each active virtual machine (e.g., 130*a*-130*n*) associated with a hypervisor (e.g., 150*a*, 150*n*).

In one example, the application (e.g., 145*a*) may be configured to read a first value of the migration counter and a second value of the migration counter. Responsive to the application (e.g., 145*a*) determining that the first value of the migration counter does not equal the second value of the migration counter, the application (e.g., 145*a*) may ascertain whether a value of a hardware parameter associated with a host processing device (e.g., CPU 170*a*, CPU 170*i*, CPU 170*n*, etc.) associated with the application (e.g., 145*a*) has changed during a time interval.

If the value of the migration counter does not change between readings of the first value of the migration counter and the second value of the migration counter during the time interval, then the application (e.g., 145*a*) may be configured to declare the value of a performance monitoring unit derived from the hardware parameter to be valid. If the application (e.g., 130*a*, 145*a*) ascertains that the second value of the migration counter differs from the first value of the migration counter by more than one count (e.g., indicating two or more migrations of the application 145*a*), then the application (e.g., 130*a*, 145*a*) may be configured to declare the value of performance monitoring unit to be invalid.

However, if the second value of the migration counter differs from the first value of the migration counter by one count, it is not certain whether the value of the performance monitoring unit derived from the hardware parameter is valid or not valid. In such circumstances, the application (e.g., 145*a*) may be configured to read a third value of the counter.

The application (e.g., 145*a*) may be configured to declare the value of the performance monitoring unit to be valid responsive to determining that the third value of the migration counter differs from the first value of the migration counter by one count and the value of hardware parameter has not changed during the time interval. The application (e.g., 145*a*) may be configured to declare the value of the performance monitoring unit to be invalid responsive to determining that a third value of the counter differs from the first value of the counter by one count and the value of hardware parameter has changed during the time interval.

Figure 2:
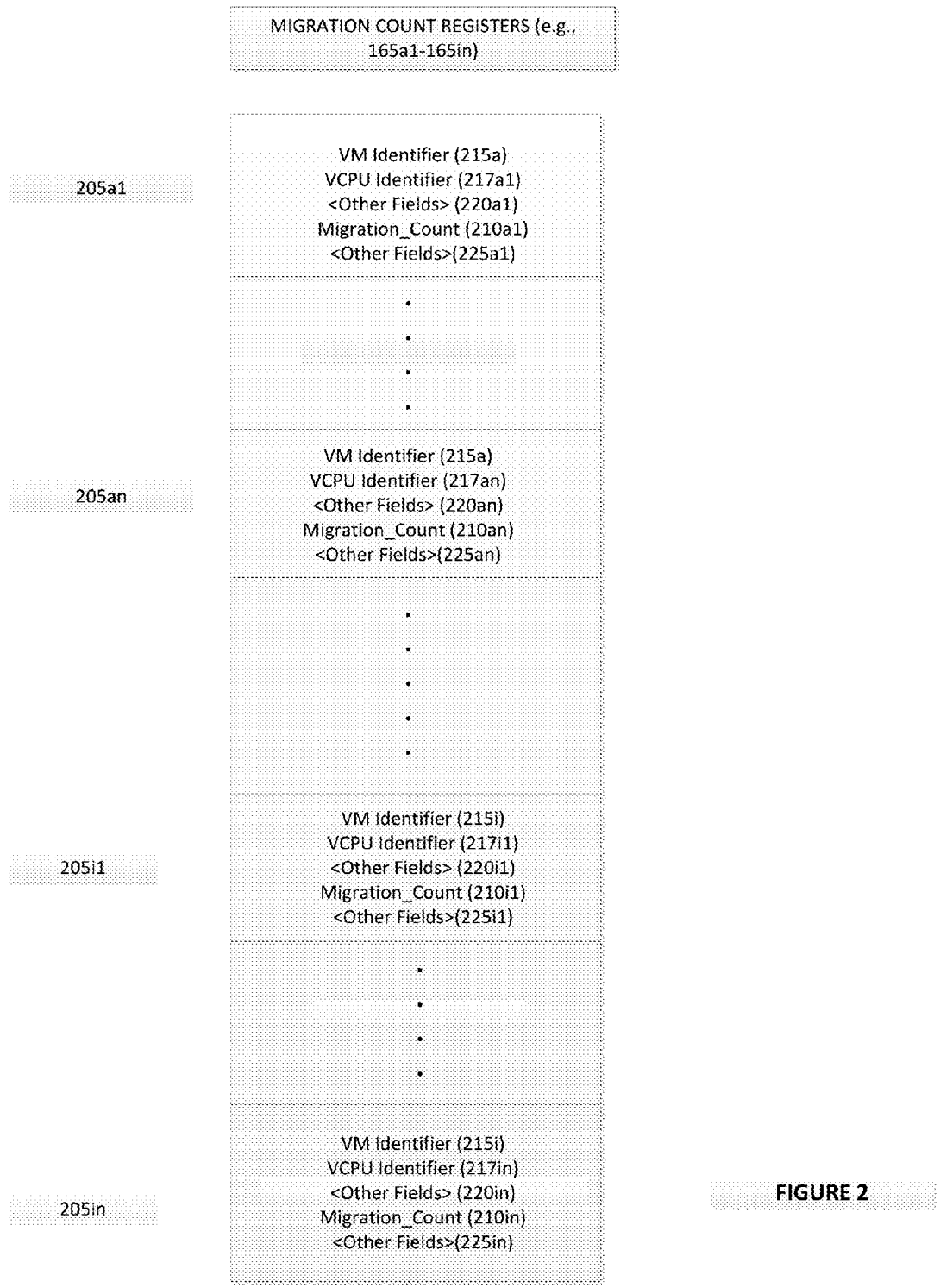
FIG. 2 is a block diagram that illustrates one example of a configuration of a plurality of migration count registers managed by a hypervisor.

FIG. 2 is a block diagram that illustrates one example of a configuration of a plurality of migration count registers (e.g., 165a-165i) managed by a hypervisor (150a). The hypervisor (e.g., 150a, 150n) may manage the migration count registers (e.g., 165a-165i, 165j-165n, respectively). An application (e.g., 145a) may be provided by the hypervisor (e.g., 150a) with a value of a migration counter (e.g., 165a) associated with the virtual machine (e.g., 130a) on which it resides and not the migration counter (e.g., 165i, 165n) of another virtual machine (e.g., 130i, 130n). In one example, the hypervisors (e.g., 150a, 150n) may be configured to store/write/retrieve/update one or more counters in the migration count registers 165a-165n corresponding to paravirtualized migration counts for each of its active virtual machine (e.g., 130a-130n). In an example, the hypervisor (e.g., 150a, 150n) may maintain a migration counter in a data structure (e.g., the entry 205a) associated with a virtual machine (e.g., 130a). In one example, the virtual machine structure (e.g., 205a) may be constructed as follows:

Guest—structure:
   <other fields>
   uint64_t migration_count;
   <other fields>

Within this virtual machine structure (e.g., 205a), a field (e.g., 210a) (e.g., Uint64_t migration_count) contains a migration counter. The hypervisor (e.g., 150a) may initialize migration counter to 0 when a corresponding virtual machine (e.g., 130a) is started.

Each guest identifier (e.g. 215a) identifies a virtual machine structure (e.g., 205a). Each virtual machine structure (e.g., 205a) may include, for example, a paravirtualized migration counter 210a (e.g., Migration_Count 210a) corresponding to an associated virtual machine (e.g., 130a).

The virtual machine structure (e.g., 205a) may include other parameters (e.g., 220a, 225a) that may provide a virtual machine (e.g., 130a-130i) with access to one or more hardware parameters and/or PMU counters(e.g., processor frequency, TSCs, cache line size of a cache (e.g., 185a-185i), cache misses, etc.) of the underlying hardware of the host (e.g., of the CPUs 170a-170i, of the memory 180a-180i, of the other physical devices 190a-190i, etc.). In another example, the hypervisor (e.g., 150a) may paravirtualize or expose (e.g., directly provide access to) the one or more hardware parameters/PMU counters from corresponding MSRs (e.g., 175a-175i) of the underlying hardware to a virtual machine (e.g., 130a-130i). In another example, the hypervisor (e.g., 150a) may make its presence known to a guest application (e.g., 145a-145i) at virtual machine boot time. The hypervisor (e.g., 150a) may advertise the availability of a paravirtualized migration counter (e.g., 210a) and/or the one or more hardware parameters/PMU counters from corresponding MSRs (e.g., 175a-175i) of the underlying hardware to the virtual machine (e.g., 130a) at boot time. The application (e.g., 145a) running on the virtual machine (e.g., 130a) may read the paravirtualized migration counter (e.g., 210a) and/or the one or more hardware parameters/PMU counters from corresponding MSRs (e.g., 175a-175i) of the underlying hardware to the virtual machine (e.g., 130a) using a paravirtualized system call or to access its corresponding "synthetic" MSRs (e.g., 165a) in the migration count registers (e.g., 165a-165i) managed by a hypervisor (150a).

In one example, the hypervisors (e.g., 150a, 150n) may read "real" MSRs of the underlying hardware and place their values in the "synthetic MSRs" (e.g., 165a-165n) to produce the paravirtualized migration counters associated with the virtual machines (e.g., 130a-130n). In another example, the hypervisors (e.g., 150a, 150n) may read "real" MSRs of the underlying hardware and place their values in the migration count registers (e.g., 165a-165n)). In another example, a migration count register (e.g., 165a) associated with a virtual machine (e.g., 130a) may be mapped by the hypervisor (e.g., 150a) directly into the address space of the virtual machine (e.g., 130a), for example, at virtual machine boot time. When the migration count registers (e.g., 165a-165n) are mapped by the hypervisors (e.g., 150a, 150n) into the address space of the corresponding virtual machines (e.g., 130a-130n), an associated application (e.g., 145a-145n) may read the migration_count and/or the one or more hardware parameters/PMU counters from corresponding MSRs (e.g., 175a-175n) directly. There are well known mechanisms for guest software to discover whether the hypervisor (e.g., 150a) supports synthetic MSRs or paravirtualized system calls.

In an example, when a source host (e.g. 100a) migrates a virtual machine (VM) (e.g., 130a) to a destination host (100n), the source host (e.g. 100a) transfers the migration_count field in the migration count register (e.g., 165a) with the VM's metadata to a corresponding migration count register (e.g., 165n) of the destination host (e.g., 100n). In an example, either the hypervisor (e.g., 150a) of the source host (e.g. 100a) or the hypervisor (e.g., 150n) of the destination host (100n) may increment the migration_count field to signify a migration event.

Figure 3:
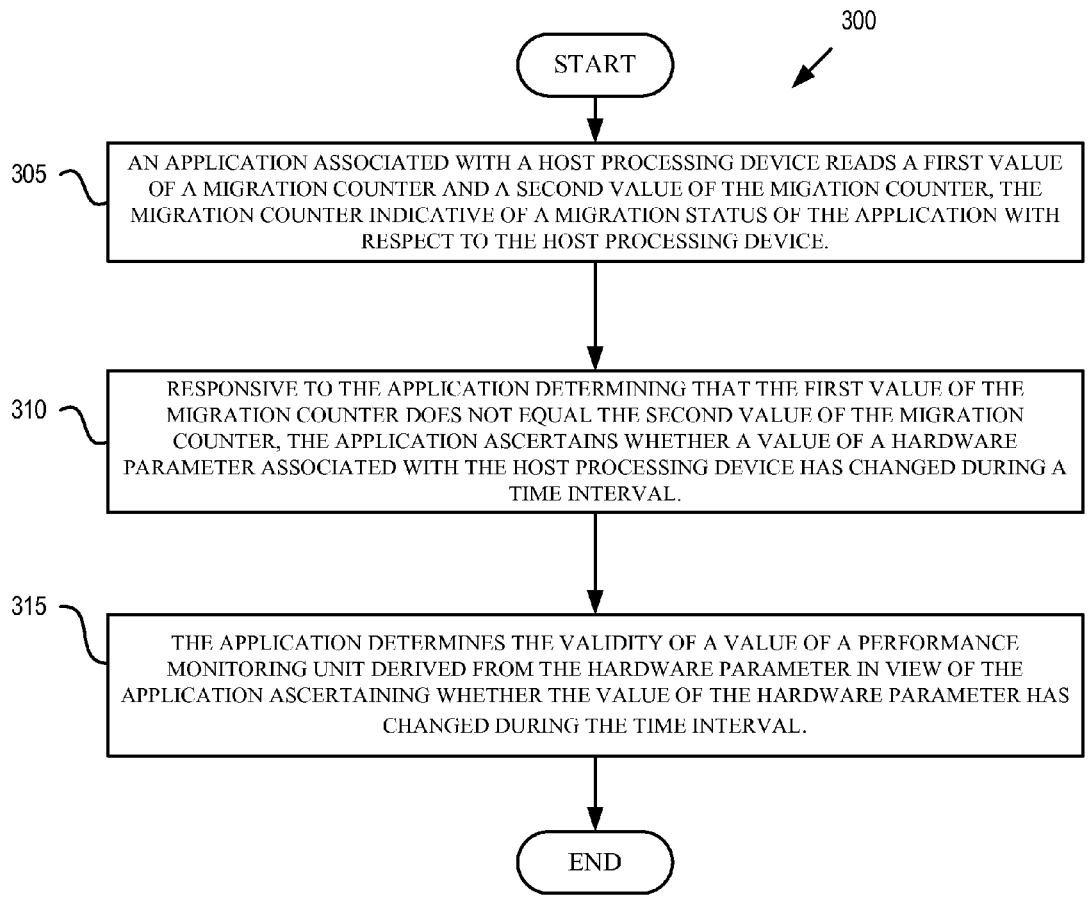
FIG. 3 is a flow diagram illustrating an example of a method for permitting an application running in a virtual machine to determine whether the virtual machine has migrated during a measurement interval, and based on that knowledge, determine whether values of a performance monitoring unit obtained during the measurement interval are valid or invalid.

FIG. 3 is a flow diagram illustrating an example of a method 300 for permitting an application running in a virtual machine (e.g., 130a), to determine whether the virtual machine (e.g., 130a) has migrated during a measurement interval, and based on that knowledge, determine whether values of a performance monitoring unit obtained during the measurement interval are valid or invalid. The method 300 may be performed by the source host 100a and/or the destination host 100n of FIG. 1 and may comprise hardware (e.g., circuitry, dedicated logic, programmable logic, microcode, etc.), software (e.g., instructions run on a processing device), or a combination thereof. In one example, the method 300 is performed by an application (e.g., 145a-145n) of the source host 100a and/or the destination host 100n of FIG. 1.

As shown in FIG. 3, to permit the application (e.g., 145a) running on a virtual machine (e.g., 130a) to determine whether values of a performance monitoring unit obtained at different time intervals are valid or invalid, at block 305, the application (e.g., 145a) reads a first value of a migration counter and a second value of the migration counter. In an example, the application may run as an executable program on an associated virtual machine (e.g., 130a) or the application may be the virtual machine (e.g., 130) itself. The application (e.g., 130a, 145a) may be, for example, associated with a host processing device (e.g., the CPU 170a).

The migration counter may be indicative of a migration status of the application (e.g., 145a) with respect to the host processing device (e.g., the CPU 170a). The migration status indicates a count of the number of times the application (e.g., 145a) has migrated from one host processing device (e.g., the CPU 170a) to another host processing device (e.g., the CPU 170i or CPU 170n). A hypervisor (e.g., 150a) associated with a virtual machine (e.g., 130a) may be configured to maintain, manipulate (e.g., increment, reset), and provide the application (e.g., 130a, 145a) with access to the migration counter associated with the virtual machine (e.g., 130a). The migration counter may be stored by the hypervisor (e.g., 150a) in a synthesized paravirtualized migration count register (e.g., 165n). The migration count register may be a model-specific register (MSR).

In one example, the migration count values for a plurality of virtual machines (e.g., 130a-130n) may be stored in a plurality of paravirtualized migration count registers (165a-165n) by an associated host migration agent (e.g., 160a, 160n) of a hypervisor (e.g., 150a, 150n). Each register of the plurality of paravirtualized migration count registers (165a-165n) may correspond to each active virtual machine (e.g., 130a-130n) associated with a hypervisor (e.g., 150a, 150n).

In one example, the migration counter may be stored by the host migration agent (e.g., 160a, 160n) in the memory space of the application (e.g., 145a, 130a). In another example, application (e.g., 145a, 130a) may read the migration counter from one register of the plurality of paravirtualized migration count registers (165a-165n) through a system call to the hypervisor (e.g., 150a).

At block 310, responsive to the application (e.g., 130a, 145a) determining that the first value of the migration counter does not equal the second value of the migration counter, the application (e.g., 130a, 145a) ascertains whether a value of a hardware parameter associated with the host processing device (e.g., the CPU 170a) has changed during a time interval. In an example, the hardware parameter may be at least one of an operating frequency of the host processing device, a cache-line size of the host processing device, etc. In an example, a performance monitoring unit counter may be at least one of a time stamp count (TSC), a count of cache misses, etc.

At block 315, the application (e.g., 130a, 145a) determines the validity of a value of a performance monitoring unit derived from the hardware parameter in view of the application (e.g., 130a, 145a) ascertaining whether the value of the hardware parameter has changed during the time interval.

In one example, if the second value of the migration counter does not differ from the first value of the migration counter, then the application (e.g., 130a, 145a) may declare the value of performance monitoring unit to be valid. In one example, if the application (e.g., 130a, 145a) ascertains that the second value of the migration counter differs from the first value of the migration counter by more than one count (e.g., indicating two or more migrations of the application 130a, 145a), then the application (e.g., 130a, 145a) may declare the value of performance monitoring unit to be invalid.

However, if the second value of the migration counter differs from the first value of the migration counter by one count, then the application (e.g., 130a, 145a) may read a third value of the counter. If the application (e.g., 130a, 145a) ascertains that the third value of the migration counter differs from the first value of the migration counter by one count and the value of hardware parameter has not changed, then the application (e.g., 130a, 145a) declares the value of the performance monitoring unit to be valid. If the application (e.g., 130a, 145a) ascertains that the third value of the migration counter differs from the first value of the counter by one count and the value of hardware parameter has changed, then the application (e.g., 130a, 145a) declares the value of the performance monitoring unit to be invalid; otherwise, the application declares the value of the performance monitoring unit to be valid.

FIG. 4 is an example of a performance monitoring tool application (e.g., 145a) employing the method of FIG. 3 to program and read hardware parameters stored in PMU registers while running in a virtual machine. The application (e.g., 145a) determines if it may employ the PMU registers (e.g., TSCs/counts of cache misses, etc.) read during a measurement interval. The application (e.g., 145a) reads a first paravirtualized migration count (M1). The application (e.g., 145a) reads a hardware parameter, for example, a processor frequency (F1), then performs a first measurement of one or more performance monitoring unit values during a time interval. The application (e.g., 145a) reads a second paravirtualized migration count (M2). If M1 equals M2, indicating no migration event has occurred, then the application (e.g., 145a) declares the measurement of one or more performance monitoring units to be valid. If M1 differs from M2 by more than one count, indicating two or more migration events have occurred, then the application (e.g., 145a) declares the measurement of one or more performance monitoring units to be invalid.

If M2 differs from M1 by one count, then the application (e.g., 145a) performs a second measurement of the hardware parameter (F2) and a third measurement of the paravirtualized migration counter (M3). If the difference between M3 and M1 is one count, indicating one migration event has occurred, and F1 is equal to F2, indicating no change in the measured parameter, then the application declares the measurement of the one or more performance monitoring units to be valid; otherwise, the application declares the measurement of the one or more performance monitoring units to be invalid.

Note: If (M3−M1)>1 && F1==F2, the virtual machine (e.g., 130a) may have migrated from the source host 100a to the destination host 100b and back to the source host 100a. The frequency would be the same and could mislead the performance monitoring tool (145a) to report the measurement of one or more performance monitoring units as valid when it may or may not be valid. The performance monitoring tool (145a) has no processor information about destination host 100b, so it cannot make that determination.

FIG. 5 is another example of a performance monitoring tool application (e.g., 145a) employing the method of FIG. 3 to auto-tune the application. The performance monitoring tool application (e.g., 145a) may obtain the paravirtualized migration counter associated with the virtual machine (e.g., 130a) and any important processor attributes (e.g., hardware parameters) of its associated processor (e.g., the CPU 170a) before and after performing its tuning calculations. The performance monitoring tool application (e.g., 145a) may periodically read the paravirtualized migration counter. If the paravirtualized migration counter has changed, the performance monitoring tool application (e.g., 145a) may read associated processor attributes and makes the decision to re-measure and adjust the tuning for a new host system (e.g., the CPU 170n).

FIG. 6 is an example of a performance monitoring tool application (e.g., 145a) employing the method of FIG. 3 to program and read hardware parameters stored in PMU registers while running in a virtual machine. The application (e.g., 145a) determines if it may employ the PMU registers (e.g., TSCs/counts of cache misses, etc.) read during a measurement interval. The application (e.g., 145a) reads a first paravirtualized migration count (M1). The application (e.g., 145a) reads a hardware parameter, for example, a processor frequency (F1), then performs a first measurement of one or more performance monitoring unit values during a time interval. The application (e.g., 145a) performs a second measurement of the hardware parameter (F2) and reads a second paravirtualized migration count (M2). If M1 equals M2, indicating no migration event has occurred, then the application (e.g., 145a) declares the measurement of one or more performance monitoring units to be valid. If M1 differs from M2, then the application (e.g., 145a) declares the measurement of one or more performance monitoring units to be invalid.

Figure 7:
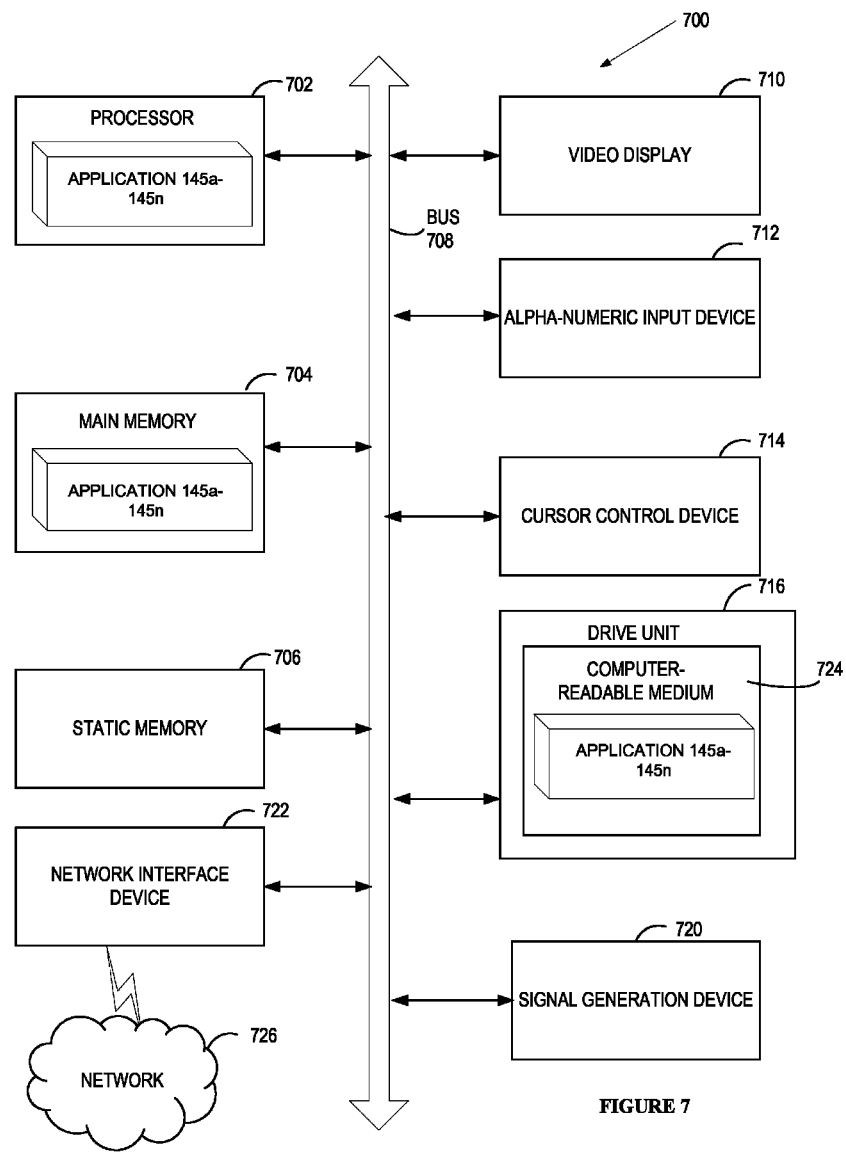
FIG. 7 illustrates a diagrammatic representation of a machine in the example form of a computer system within which a set of instructions, for causing the machine to perform any one or more of the methodologies discussed herein, may be executed.

FIG. 7 illustrates a diagrammatic representation of a machine in the example form of a computer system 700 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The application 145a-145n and the host migration agent 160a, 160n shown in FIG. 1 may be executed by processor 702 configured to perform the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

A drive unit 716 may include a computer-readable medium 724 on which is stored one or more sets of instructions (e.g., instructions of the application 145a-145n and the host migration agent 160a, 160n) embodying any one or more of the methodologies or functions described herein. The instructions of the application 145a-145n and the host migration agent 160a, 160n may also reside, completely or at least partially, within the main memory 704 and/or within the processor 702 during execution thereof by the computer system 700, the main memory 704 and the processor 702 also constituting computer-readable media. The instructions of the application 145a-145n and the host migration agent 160a, 160n may further be transmitted or received over a network 726 via the network interface device 722.

While the computer-readable storage medium 724 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "writing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   determining, by a processing device, a first value of a counter and a second value of the counter, wherein the counter is indicative of a migration status of an application with respect to the processing device;
   responsive to determining that the first value of the counter does not equal the second value of the counter, ascertaining whether a value of a hardware parameter associated with the processing device has changed during a time interval; and
   determining, by the processing device, validity of a value of a performance monitoring unit derived from the hardware parameter in view of said ascertaining.

2. The method of claim 1, wherein the migration status indicates a count of the number of times the application has migrated to another processing device.

3. The method of claim 1, wherein determining the validity of the value of the performance monitoring unit further comprises determining that the value of the performance monitoring unit is invalid responsive to determining that the second value of the counter differs from the first value of the counter by more than one count.

4. The method of claim 1, wherein determining the validity of the value of the performance monitoring unit further comprises reading a third value of the counter responsive to determining that the value of the hardware parameter has changed by one count during the time interval.

5. The method of claim 4, wherein determining the validity of the value of the performance monitoring unit further comprises determining that the value of the performance monitoring unit is valid responsive to determining that the third value of the counter differs from the first value of the counter by one count and the value of hardware parameter has not changed during the time interval.

6. The method of claim 4, wherein determining the validity of the value of the performance monitoring unit further comprises determining that the value of the performance monitoring unit is invalid responsive to determining that the third value of the counter differs from the first value of the counter by one count and the value of hardware parameter has changed during the time interval.

7. The method of claim 1, wherein the hardware parameter is provided by at least one of an operating frequency of the processing device or a cache-line size of the processing device.

8. The method of claim 1, wherein the performance monitoring unit is provided by at least one of a time stamp count or a count of cache misses.

9. The method of claim 1, further comprising retrieving the first value of the counter from a model-specific register.

10. The method of claim 1, further comprising retrieving the first value of the counter from a memory space of the application.

11. The method of claim 1, wherein determining the first value of the counter comprises performing a system call to a hypervisor.

12. The method of claim 1, wherein the application is provided by a virtual machine.

13. A system, comprising:
    a memory;
    a processing device, operatively coupled to the memory, the processing device to:
    determine a first value of a counter and a second value of the counter, wherein the counter is indicative of a migration status of an application with respect to the processing device;
    responsive to determining that the first value of the counter does not equal the second value of the counter, ascertain whether a value of a hardware parameter associated with the processing device has changed during a time interval; and
    determine validity of a value of a performance monitoring unit derived from the hardware parameter in view of said ascertaining.

14. The system of claim 13, wherein the migration status indicates a count of the number of times the application has migrated from one processor to another processing device.

15. The system of claim 13, wherein the processing device is further to determine that the value of the performance monitoring unit is invalid responsive to determining that the second value of the counter differs from the first value of the counter by more than one count.

16. The system of claim 13, wherein the processing device is further to read a third value of the counter responsive to determining that the value of the hardware parameter has changed by one count during the time interval.

17. A non-transitory computer-readable storage medium including instructions that, when accessed by a processing device, cause the processing device to:
    determining, by the processing device, a first value of a counter and a second value of the counter, wherein the counter is indicative of a migration status of an application with respect to the processing device; and
    responsive to determining that the first value of the counter does not equal the second value of the counter, ascertain whether a value of a hardware parameter associated with the processing device has changed during a time interval; and
    determining, by the processing device, validity of a value of a performance monitoring unit derived from the hardware parameter in view of said ascertaining.

18. The non-transitory computer-readable storage medium of claim 17, wherein the migration status indicates a count of the number of times the application has migrated from one processor to another processing device.

19. The non-transitory computer-readable storage medium of claim 17, further comprising executable instructions causing the processing device to determine that the value of the performance monitoring unit to be invalid responsive to determining that the second value of the counter differs from the first value of the counter by more than one count.

20. The non-transitory computer-readable storage medium of claim 17, further comprising executable instructions causing the processing device to read a third value of the counter responsive to determining that the value of the hardware parameter has changed by one count during the time interval.

* * * * *